United States Patent [19]
Pfeiffer et al.

[11] Patent Number: 5,992,998
[45] Date of Patent: *Nov. 30, 1999

[54] OPHTHALMIC LENS HAVING A PROGRESSIVE EFFECT

[75] Inventors: Herbert Pfeiffer; Helmut Altheimer; Walter Haimerl, all of München, Germany

[73] Assignee: Optische Werke G. Rodenstock, Munich, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/448,500

[22] PCT Filed: Oct. 28, 1994

[86] PCT No.: PCT/DE94/01268

§ 371 Date: Jun. 5, 1995

§ 102(e) Date: Jun. 5, 1995

[87] PCT Pub. No.: WO95/12832

PCT Pub. Date: May 11, 1995

[30] Foreign Application Priority Data

Nov. 2, 1993 [DE] Germany .............................. 43 37 369

[51] Int. Cl.⁶ ...................................................... G02C 7/06
[52] U.S. Cl. ............................................ 351/169; 351/176
[58] Field of Search ................................... 351/169, 176, 351/161, 168

[56] References Cited

U.S. PATENT DOCUMENTS

| | | | |
|---|---|---|---|
| 4,613,217 | 9/1986 | Fuerter et al. | 351/176 |
| 4,786,160 | 11/1988 | Fürter | 351/169 |
| 4,854,689 | 8/1989 | Dufour et al. | 351/169 |
| 5,488,442 | 1/1996 | Harsigny et al. | 351/169 |

*Primary Examiner*—Georgia Epps
*Assistant Examiner*—Jordan M. Schwartz
*Attorney, Agent, or Firm*—Antonelli, Terry, Stout & Kraus, LLP

[57] ABSTRACT

Disclosed is an ophthalmic lens having a progressive optic power, this lens being provided with at least one surface having a surface power which changes in such a manner that, starting from at least one region, in which the optic power of the ophthalmic lens is practically constant, the optic power of the ophthalmic lens changes along at least one line (hereinafter referred to as the main line) which may lie in a plane or be sinuous and on which there is a prescribed astigmatism which is not identical with zero diopter. The surface astigmatism on the main line not only being a specific amount but also having a usually not constant axial position along the main line in such a manner that the resulting overall astigmatism of the bundle, allowing for oblique astigmatism, being practically constant along the main line after the surface of the lens facing the eye or being variable with regard to both said amount and said axial position according to physiological requirements.

9 Claims, 1 Drawing Sheet

OPHTHALMIC LENS HAVING A PROGRESSIVE EFFECT

TECHNICAL FIELD

The present invention relates to an ophthalmic lens having a progressive optic power, the line being provided with at least one surface having a surface power which changes in such a manner that, starting from at least one region, in which the optic power of the ophthalmic lens is practically constant, the optic power of the ophthalmic lens changes along at least one line (hereinafter referred to as the main line) which may lie in a plane or be sinuous and on which there is a prescribed astigmatism which is not identical with zero diopter.

STATE OF THE ART

Ophthalmic lenses having a progressive effect according to the introductory part of claim 1 are, by way of illustration, known from DE 30 16 935 C2, DE-PS 1 145 820 or GB-PS 775 007.

In the case of the ophthalmic lenses having a progressive effect known from the patent literature and/or available on the market, the inevitable surface astigmatism present on a surface having a varying surface refractive power is rather regarded as an accompanying factor to be taken into account, the amount of which should not, at least on the main meridian respectively main line, exceed a physiologically disturbing value; with regard to this reference is made to the previously mentioned DE 30 16 935 C2 or EP 0 027 339 A2. It has even been frequently proposed to form the main meridian as the umbilical line, i.e., as the line in which the surface astigmatism is zero; with regard to this reference is made, by way of example, to DE-AS 20 44 639 or DE-PS 28 14 936. The axial position of the astigmatism finds no consideration in these printed publications.

Apparently, it is accepted that the axial position of the surface astigmatism is set according to surface theoretical considerations and not according to physiological ones: as the overall astigmatism is yielded by the geometric addition of the surface astigmatism and the oblique astigmatism, the axial position of the overall astigmatism varies along the main meridian respectively the main line (which may follow approximately the main line of vision) in such a manner that a clear-vision-preventing variation of the axial position of the overall astigmatism along the main meridian respectively along the main line is yielded.

If an ophthalmic lens having a toric respectively astigmatic effect suited for corrective purposes can now be realized with the state of the art progressive surfaces, the astigmatic effect required for correction is achieved solely due to the design of the second surface: in this event, the second surface is designed as a toric respectively an atoric surface (cf., e.g., DE 30 16 936 C2). The term "atoric" means a surface with an astigmatic power, in which at least one main section is not spherical, namely the shape of one main section departs from the shape of a circle.

Only DE-PS 1 145 820 mentioned in the introduction describes a surface the surface astigmatism of which has a constant amount over the entire surface yielding, taking the second surface into consideration, an ophthalmic lens having a specific astigmatism which can also serve corrective purposes. In this state of the art ophthalmic lens, the axial position of the surface astigmatism of progressive surfaces is constant along the plane main meridian, noteably 0° respectively 90°.

An axial position deviating therefrom has therefore to be realized by means of the second surface, nonetheless yielding, in the event of use of a toric second surface, a physiological, possibly, disturbing variation of the overall astigmatism while taking into consideration oblique astigmatism.

DESCRIPTION OF THE INVENTION

The present invention is based on the fundamental concept of improving an ophthalmic lens with a progressive effect having at least one surface with a surface power which changes in such a manner that, starting from at least one region in which the effect or the optic power of the ophthalmic lens is at least approximately constant, the optic power of the ophthalmic lens changes along a line (hereinafter referred to as main line) which can lie in a plane or be sinuous and on which a prescribed astigmatism is not identical with zero diopter in such a manner that there are no disturbing variations of the amount of and of the axial position of the overall astigmatism. That is, the changes in the resulting astigmatism both regarding amount and regarding axial position should be so small that they cause no disturbance.

An invented opthalmic lens is described in claim 1. An element of the present invention is that the surface astigmatism on the main line not only has a specific amount but also has a usually not constant axial position along the main line in such a manner that, allowing for oblique astigmatism, the resulting overall astigmatism of the bundle is practically constant along the main line after the surface of the spectacle lens facing the eye or is designed according to the physiologial requirements both with regard to amount and to axial position. Contrary to the state of the art, in the case of the invented lens a specific amount of the surface astigmatism differing from 0 diopter over at least one part of the main line is prescribed but also the axial position of the surface astigmatism is prescribed. By way of illustration, the axial position of an astigmatic eye changes when lowering the glance. This can be taken into account by a corresponding (correcting) rotation of the axial position of the surface astigmatism.

The possibility of prescribing the amount of and the axial position of the surface astigmatism permitted by the invented design occurs under the, as such, known physiological considerations.

In one embodiment of the invention only one surface contributes to changing the optic power, the other surface of the lens can therefore be designed in a conventional manner as the so-called prescription surface with a spherical or a toric effect.

Due to the invented design of the main meridian respectively the main line, it is however preferable if, at least the main part of the astigmatism serving a corrective purpose is supplied by the surface astigmtism of the surface having a changing surface power.

In this way, the second surface may always be a rotational symmetrical surface.

Naturally, however the second surface may also, have an astigmatic effect and, in particular, be designed as an atoric surface, i.e. as a surface with no circular main sections.

The main line cannot only be in the so-called progression zone, but also continue in the so-called distance part and/or near part.

Curves turned in the, as such, known manner or plane curves may be employed as the main line. In the case of the plane curves, a distinguishing feature of the present invention is that the normal vectors of the tangential planes at points along the main line do not lie in the plane of the main line, except at a finite number of points.

By way of explanation, a line normal to the main line (principal line), and also a line normal to the surface, lie in a plane perpendicular to the tangent to the main line at any point (position) along the main line and there generally form an angle with each other. This angle is zero only in the case when the main line is a geodetic line. When the main line lines in a plane, the lines normal to the main line also lie in this plane, whereas the lines normal to the surface generally do not.

In order to enable the desired correction of the astigmatism to be applied in accordance with the present invention even in the case of a main line lying in a plane, the lines normal to the surface (normal vectors of the tangential planes) must be turned out of the plane of the main line along the main line. A coincidence of the lines normal to the surface and the lines normal to the main line remains possible only at one or a few positions (see FIG. 1).

Figure 1:
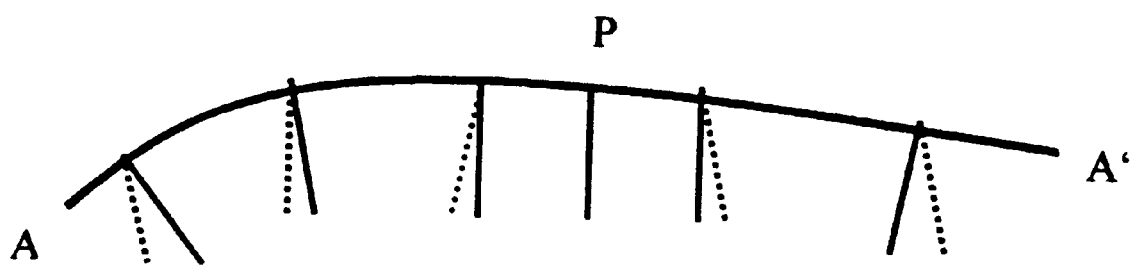
FIG. 1 shows a main line A-A' on a lens surface, the main line lying in a plane. Along the main line are shown various dotted lines normal to the surface, and various solid lines normal to the main line. The line normal to the surface is in the plane of the main line at the point P, but not elsewhere.

According to a possible preferred embodiment of an invented ophthalmic lens:

In order to prescribe not only a value of the surface astigmatism, but also of the axial position of the surface astigmatism along the main line, the main line and the region surrounding it can be yielded after prescribing the projection $f_1(y)$ of the main line onto the x, y plane by minimizing the following performance function while taking into account physiological considerations.

$$F = \int_{y_{min}}^{y_{max}} [(A - A_v)^2 + (H - H_v)^2 + (\epsilon - \epsilon_v)^2] dy$$

with $A_v(y)$, $H_v(y)$ and $\epsilon_v(y)$ being the prescribed surface properties along the main line and A(y): surface astigmatism
H(y): surface power
$\epsilon(y)$: the axial position of the surface astigmation in relation to the horizontal plane

DESCRIPTION OF THE PREFERRED EMBODIMENTS

The present invention is made more apparent in the following using preferred embodiments for the axial positions 0, 30, 45, 60 and 90°.

TABLE 1

| | | | | | | | | | |
|---|---|---|---|---|---|---|---|---|---|
| | | Refractive index: 1.525 Prescribed Axial Position: .00 Degrees | | | | | | | |
| y [mm] | x0(y) [mm] | z0(y) [mm] | Delta [degrees] | Kh [dpt] | D0v [dpt] | D0 [dpt] | Astv [dpt] | Ast [dpt] | Axis [degrees] |
| 36.0 | .000 | 2.094 | .109 | 3.110 | 2.340 | 2.340 | 1.500 | 1.500 | .00 |
| 34.0 | .000 | 1.873 | .109 | 3.108 | 2.340 | 2.340 | 1.500 | 1.500 | .00 |
| 32.0 | .000 | 1.664 | .109 | 3.106 | 2.340 | 2.340 | 1.500 | 1.500 | .00 |
| 30.0 | .000 | 1.467 | .109 | 3.104 | 2.340 | 2.340 | 1.500 | 1.500 | .00 |
| 28.0 | .000 | 1.283 | .109 | 3.102 | 2.340 | 2.340 | 1.500 | 1.499 | .00 |
| 26.0 | .000 | 1.112 | .108 | 3.100 | 2.341 | 2.340 | 1.500 | 1.499 | .00 |
| 24.0 | −.001 | .952 | .108 | 3.099 | 2.341 | 2.340 | 1.500 | 1.499 | .00 |
| 22.0 | −.002 | .805 | .108 | 3.098 | 2.342 | 2.341 | 1.500 | 1.499 | .00 |
| 20.0 | −.003 | .669 | .107 | 3.098 | 2.343 | 2.342 | 1.500 | 1.499 | .00 |
| 18.0 | −.005 | .546 | .106 | 3.099 | 2.345 | 2.344 | 1.500 | 1.499 | .00 |
| 16.0 | −.010 | .436 | .105 | 3.101 | 2.348 | 2.347 | 1.500 | 1.499 | .00 |
| 14.0 | −.018 | .337 | .102 | 3.105 | 2.353 | 2.352 | 1.500 | 1.499 | .00 |
| 12.0 | −.032 | .251 | .097 | 3.113 | 2.362 | 2.361 | 1.500 | 1.499 | .00 |
| 10.0 | −.057 | .177 | .089 | 3.128 | 2.377 | 2.376 | 1.500 | 1.500 | .00 |
| 8.0 | −.103 | .115 | .073 | 3.152 | 2.400 | 2.400 | 1.500 | 1.501 | .00 |
| 6.0 | −.181 | .066 | .046 | 3.191 | 2.440 | 2.439 | 1.500 | 1.504 | .00 |
| 4.0 | −.311 | .030 | .000 | 3.255 | 2.503 | 2.502 | 1.500 | 1.507 | .00 |
| 2.0 | −.515 | .008 | −.073 | 3.356 | 2.604 | 2.602 | 1.500 | 1.508 | .00 |
| .0 | −.802 | .000 | −.181 | 3.510 | 2.759 | 2.758 | 1.500 | 1.503 | .00 |
| −2.0 | −1.156 | .008 | −.321 | 3.734 | 2.987 | 2.986 | 1.500 | 1.497 | .00 |
| −4.0 | −1.527 | .035 | −.478 | 4.041 | 3.313 | 3.291 | 1.500 | 1.499 | .00 |
| 6.0 | −1.852 | .082 | −.628 | 4.405 | 3.654 | 3.653 | 1.500 | 1.502 | .00 |
| −8.0 | −2.097 | .150 | −.750 | 4.752 | 3.997 | 4.000 | 1.500 | 1.498 | .00 |
| −10.0 | −2.262 | .243 | −.839 | 4.988 | 4.228 | 4.234 | 1.500 | 1.495 | .00 |
| −12.0 | −2.363 | .361 | −.895 | 5.085 | 4.331 | 4.325 | 1.500 | 1.498 | .00 |
| −14.0 | −2.423 | .506 | −.930 | 5.105 | 4.339 | 4.339 | 1.500 | 1.499 | .00 |
| −16.0 | −2.457 | .678 | −.951 | 5.111 | 4.340 | 4.340 | 1.500 | 1.498 | .00 |
| −18.0 | −2.476 | .878 | −.963 | 5.117 | 4.340 | 4.339 | 1.500 | 1.498 | .00 |
| −20.0 | −2.487 | 1.105 | −.971 | 5.125 | 4.340 | 4.339 | 1.500 | 1.498 | .00 |
| −22.0 | −2.493 | 1.361 | −.977 | 5.135 | 4.340 | 4.339 | 1.500 | 1.499 | .00 |
| −24.0 | −3.496 | 1.644 | −.981 | 5.145 | 4.340 | 4.340 | 1.500 | 1.499 | .00 |
| −26.0 | −2.498 | 1.956 | −.985 | 5.157 | 4.340 | 4.340 | 1.500 | 1.500 | .00 |
| −28.0 | −2.499 | 2.294 | −.989 | 5.169 | 4.340 | 4.340 | 1.500 | 1.500 | .00 |
| −30.0 | −2.499 | 2.665 | −.993 | 5.182 | 4.340 | 4.340 | 1.500 | 1.500 | .00 |
| −32.0 | −2.500 | 3.062 | −.997 | 5.197 | 4.340 | 4.340 | 1.500 | 1.500 | .00 |
| −34.0 | −2.500 | 3.481 | −1.002 | 5.212 | 4.340 | 4.340 | 1.500 | 1.500 | .00 |
| −36.0 | −2.500 | 3.945 | −1.006 | 5.229 | 4.340 | 4.340 | 1.500 | 1.500 | .00 |

TABLE 1-continued

Refractive index: 1.525 Prescribed Axial Position: .00 Degrees

| y [mm] | x0(y) [mm] | z0(y) [mm] | Delta [degrees] | Kh [dpt] | D0v [dpt] | D0 [dpt] | Astv [dpt] | Ast [dpt] | Axis [degrees] |
|---|---|---|---|---|---|---|---|---|---|
| y [mm] | x0(y) [mm] | z0(y) [mm] | Delta [degrees] | Kh [dpt] | D0v [dpt] | D0 [dpt] | Astv [dpt] | Ast [dpt] | Axis [degrees] |

TABLE 2

Refractive index: 1.525 Prescribed Axial Position: 30.00 Degrees

| y [mm] | x0(y) [mm] | z0(y) [mm] | Delta [degrees] | Kh [dpt] | D0v [dpt] | D0 [dpt] | Astv [dpt] | Ast [dpt] | Axis [degrees] |
|---|---|---|---|---|---|---|---|---|---|
| 36.0 | .000 | 2.623 | 2.402 | 2.742 | 2.340 | 2.340 | 1.500 | 1.500 | 30.00 |
| 34.0 | .000 | 2.347 | 2.254 | 2.739 | 3.340 | 2.340 | 1.500 | 1.500 | 30.00 |
| 32.0 | .000 | 2.087 | 2.107 | 2.737 | 2.340 | 2.340 | 1.500 | 1.500 | 30.00 |
| 30.0 | .000 | 1.841 | 1.960 | 3.734 | 2.340 | 2.340 | 1.500 | 1.500 | 30.00 |
| 28.0 | .000 | 1.611 | 1.814 | 2.732 | 2.340 | 2.340 | 1.500 | 1.500 | 30.00 |
| 26.0 | .000 | 1.397 | 1.669 | 2.730 | 2.341 | 2.341 | 1.500 | 1.500 | 30.00 |
| 24.0 | −.001 | 1.197 | 1.524 | 2.728 | 2.341 | 2.341 | 1.500 | 1.500 | 30.00 |
| 22.0 | −.002 | 1.013 | 1.379 | 2.727 | 2.342 | 2.342 | 1.500 | 1.500 | 30.00 |
| 20.0 | −.003 | .844 | 1.235 | 2.727 | 2.343 | 2.343 | 1.500 | 1.500 | 30.00 |
| 18.0 | −.005 | .690 | 1.091 | 2.727 | 2.345 | 2.345 | 1.500 | 1.500 | 30.00 |
| 16.0 | −.010 | .551 | .946 | 2.729 | 2.348 | 2.348 | 1.500 | 1.500 | 30.00 |
| 14.0 | −.018 | .428 | .801 | 2.733 | 2.353 | 2.353 | 1.500 | 1.500 | 29.99 |
| 12.0 | −.032 | .319 | .654 | 2.740 | 2.362 | 2.362 | 1.500 | 1.500 | 29.99 |
| 10.0 | −.057 | .226 | .504 | 2.754 | 2.377 | 2.376 | 1.500 | 1.501 | 29.98 |
| 8.0 | −.103 | .148 | .348 | 2.777 | 2.400 | 2.399 | 1.500 | 1.501 | 29.95 |
| 6.0 | −.181 | .085 | .182 | 2.816 | 2.440 | 2.437 | 1.500 | 1.502 | 29.92 |
| 4.0 | −.311 | .039 | .000 | 2.879 | 2.503 | 2.500 | 1.500 | 1.504 | 29.89 |
| 2.0 | −.515 | .010 | −.207 | 2.979 | 2.604 | 2.601 | 1.500 | 1.503 | 29.92 |
| .0 | −.802 | .000 | −.444 | 3.134 | 2.759 | 2.760 | 1.500 | 1.499 | 30.05 |
| −2.0 | −1.156 | .011 | −.712 | 3.361 | 2.987 | 2.990 | 1.500 | 1.495 | 30.13 |
| −4.0 | −1.527 | .044 | −.995 | 3.669 | 3.293 | 3.294 | 1.500 | 1.499 | 30.01 |
| −6.0 | −1.852 | .102 | −1.274 | 4.032 | 3.654 | 3.652 | 1.500 | 1.503 | 29.90 |
| −8.0 | −2.097 | .185 | −1.529 | 4.376 | 3.997 | 3.997 | 1.500 | 1.500 | 30.01 |
| −10.0 | −2.262 | .295 | −1.754 | 4.611 | 4.228 | 4.331 | 1.500 | 1.497 | 30.11 |
| −12.0 | −2.363 | .433 | −1.950 | 4.709 | 4.321 | 4.323 | 1.500 | 1.498 | 30.08 |
| −14.0 | −2.423 | .601 | −2.127 | 4.733 | 4.339 | 4.339 | 1.500 | 1.499 | 30.02 |
| −16.0 | −2.457 | .798 | −2.291 | 4.741 | 4.340 | 4.340 | 1.500 | 1.500 | 30.01 |
| −18.0 | −2.476 | 1.026 | −2.450 | 4.749 | 4.340 | 4.340 | 1.500 | 1.500 | 30.01 |
| −20.0 | −2.487 | 1.285 | −2.605 | 4.759 | 4.340 | 4.340 | 1.500 | 1.500 | 30.00 |
| −22.0 | −2.493 | 1.574 | −2.760 | 4.769 | 4.340 | 4.340 | 1.500 | 1.500 | 30.00 |
| −24.0 | −2.496 | 1.895 | −2.916 | 4.781 | 4.340 | 4.340 | 1.500 | 1.500 | 30.00 |
| −26.0 | −2.498 | 2.247 | −3.072 | 4.794 | 4.340 | 4.340 | 1.500 | 1.500 | 30.00 |
| −28.0 | −3.499 | 2.631 | −3.231 | 4.808 | 4.340 | 4.340 | 1.500 | 1.500 | 30.00 |
| −30.0 | −2.499 | 3.048 | −3.392 | 4.824 | 4.340 | 4.340 | 1.500 | 1.500 | 30.00 |
| −32.0 | −2.500 | 3.497 | −3.555 | 4.840 | 4.340 | 4.340 | 1.500 | 1.500 | 30.00 |
| −34.0 | −2.500 | 3.979 | −3.721 | 4.859 | 4.340 | 4.340 | 1.500 | 1.500 | 30.00 |
| −36.0 | −2.500 | 4.494 | −3.891 | 4.878 | 4.340 | 4.340 | 1.500 | 1.500 | 29.99 |
| y [mm] | x0(y) [mm] | z0(y) [mm] | Delta [degrees] | Kh [dpt] | D0v [dpt] | D0 [dpt] | Astv [dpt] | Ast [dpt] | Axis [degrees] |

TABLE 3

Refractive index: 1.525 Prescribed Axial Position: 45.00 Degrees

| y [mm] | x0(y) [mm] | z0(y) [mm] | Delta [degrees] | Kh [dpt] | D0v [dpt] | D0 [dpt] | Astv [dpt] | Ast [dpt] | Axis [degrees] |
|---|---|---|---|---|---|---|---|---|---|
| 36.0 | .000 | 3.188 | 1.868 | 2.374 | 2.340 | 2.340 | 1.000 | 1.000 | 45.00 |
| 34.0 | .000 | 2.854 | 1.753 | 2.371 | 2.340 | 2.340 | 1.000 | 1.000 | 45.00 |
| 32.0 | .000 | 2.539 | 1.639 | 2.367 | 2.340 | 2.340 | 1.000 | 1.000 | 45.00 |
| 30.0 | .000 | 2.242 | 1.525 | 2.364 | 2.340 | 2.340 | 1.000 | 1.000 | 15.00 |
| 28.0 | .000 | 1.964 | 1.412 | 2.362 | 2.341 | 2.341 | 1.000 | 1.000 | 45.00 |
| 26.0 | .000 | 1.704 | 1.300 | 2.360 | 2.341 | 2.341 | 1.000 | 1.000 | 45.00 |

TABLE 3-continued

Refractive index: 1.525 Prescribed Axial Position: 45.00 Degrees

| y [mm] | x0(y) [mm] | z0(y) [mm] | Delta [degrees] | Kh [dpt] | D0v [dpt] | D0 [dpt] | Astv [dpt] | Ast [dpt] | Axis [degrees] |
|---|---|---|---|---|---|---|---|---|---|
| 24.0 | −.001 | 1.462 | 1.188 | 2.358 | 2.342 | 2.342 | 1.000 | 1.000 | 45.00 |
| 22.0 | −.002 | 1.239 | 1.076 | 2.357 | 2.343 | 2.343 | 1.000 | 1.000 | 45.00 |
| 20.0 | −.003 | 1.033 | .964 | 2.357 | 2.346 | 2.346 | 1.000 | 1.000 | 45.00 |
| 18.0 | −.005 | .846 | .853 | 2.359 | 2.350 | 2.349 | 1.000 | 1.000 | 45.01 |
| 16.0 | −.010 | .677 | .741 | 2.363 | 2.356 | 2.356 | 1.000 | 1.000 | 45.01 |
| 14.0 | −.018 | .526 | .629 | 2.372 | 2.366 | 2.366 | 1.000 | 1.000 | 45.02 |
| 12.0 | −.032 | .394 | .515 | 2.389 | 2.384 | 2.383 | 1.000 | 1.000 | 45.03 |
| 10.0 | −.057 | .279 | .399 | 2.416 | 2.413 | 2.412 | 1.000 | 1.000 | 45.06 |
| 8.0 | −.103 | .183 | .277 | 2.463 | 2.461 | 2.459 | 1.000 | 1.000 | 45.10 |
| 6.0 | −.181 | .106 | .146 | 2.541 | 2.539 | 2.536 | 1.000 | 1.000 | 45.17 |
| 4.0 | −.311 | .049 | .000 | 2.667 | 2.666 | 2.661 | 1.000 | 1.000 | 45.26 |
| 2.0 | −.515 | .013 | −.171 | 2.868 | 2.867 | 2.863 | 1.000 | 1.000 | 45.28 |
| .0 | −.802 | .000 | −.374 | 3.178 | 3.178 | 3.176 | 1.000 | 1.000 | 45.15 |
| −2.0 | −1.156 | .014 | −.615 | 3.633 | 3.633 | 3.633 | 1.000 | 1.000 | 45.00 |
| −4.0 | −1.527 | .058 | −.883 | 4.248 | 4.247 | 4.245 | 1.000 | .999 | 45.10 |
| −6.0 | −1.852 | .136 | −1.156 | 4.974 | 4.969 | 4.967 | 1.000 | .999 | 45.11 |
| −8.0 | −2.097 | .253 | −1.409 | 5.666 | 5.653 | 5.658 | 1.000 | 1.000 | 44.74 |
| −10.0 | −2.262 | .412 | −1.628 | 6.140 | 6.115 | 6.124 | 1.000 | 1.001 | 44.51 |
| −12.0 | −2.363. | .617 | −1.811 | 6.342 | 6.302 | 6.307 | 1.000 | 1.000 | 44.74 |
| −14.0 | −2.423 | .870 | −1.970 | 6.397 | 6.338 | 6.338 | 1.000 | 1.000 | 44.97 |
| −16.0 | −2.457 | 1.172 | −2.113 | 6.423 | 6.340 | 6.340 | 1.000 | 1.000 | 45.01 |
| −18.0 | −2.476 | 1.524 | −2.248 | 6.451 | 6.340 | 6.340 | 1.000 | 1.000 | 45.01 |
| −20.0 | −2.487 | 1.926 | −2.381 | 6.483 | 6.340 | 6.340 | 1.000 | 1.000 | 45.02 |
| −22.0 | −2.493 | 2.380 | −2.513 | 6.520 | 6.340 | 6.340 | 1.000 | 1.000 | 45.03 |
| −24.0 | −2.496 | 2.887 | −2.648 | 6.561 | 6.340 | 6.339 | 1.000 | 1.000 | 45.03 |
| −26.0 | −2.498 | 3.448 | −2.786 | 6.607 | 6.340 | 6.339 | 1.000 | 1.000 | 45.04 |
| −28.0 | −2.499 | 4.063 | −2.928 | 6.659 | 6.340 | 6.339 | 1.000 | 1.000 | 45.04 |
| −30.0 | −2.499 | 4.735 | −3.076 | 6.716 | 6.340 | 6.339 | 1.000 | 1.000 | 45.04 |
| −32.0 | −2.500 | 5.464 | −3.229 | 6.779 | 6.340 | 6.339 | 1.001 | 1.000 | 45.05 |
| −34.0 | −2.500 | 6.253 | −3.389 | 6.849 | 6.340 | 6.339 | 1.000 | 1.000 | 45.04 |
| −36.0 | −2.500 | 7.103 | −3.557 | 6.926 | 6.340 | 6.338 | 1.000 | 1.000 | 45.11 |
| y [mm] | x0(y) [mm] | z0(y) [mm] | Delta [degrees] | Kh [dpt] | D0v [dpt] | D0 [dpt] | Astv [dpt] | Ast [dpt] | Axis [degrees] |

35

TABLE 4

Refractive index: 1.525 Prescribed Axial Position: 60.00 Degrees

| y [mm] | x0(y) [mm] | z0(y) [mm] | Delta [degrees] | Kh [dpt] | D0v [dpt] | D0 [dpt] | Astv [dpt] | Ast [dpt] | Axis [degrees] |
|---|---|---|---|---|---|---|---|---|---|
| 36.0 | .000 | 3.566 | 2.391 | 2.002 | 2.340 | 2.340 | 1.500 | 1.500 | 60.00 |
| 34.0 | .000 | 3.186 | 2.241 | 1.998 | 2.340 | 2.340 | 1.500 | 1.500 | 60.00 |
| 32.0 | .000 | 2.827 | 2.092 | 1.995 | 2.340 | 2.340 | 1.500 | 1.500 | 60.00 |
| 30.0 | .000 | 2.491 | 1.943 | 1.991 | 2.340 | 2.340 | 1.500 | 1.500 | 60.00 |
| 28.0 | .000 | 2.176 | 1.796 | 1.988 | 2.340 | 2.340 | 1.500 | 1.500 | 60.00 |
| 26.0 | .000 | 1.882 | 1.649 | 1.985 | 2.341 | 2.341 | 1.500 | 1.500 | 60.00 |
| 24.0 | −.001 | 1.610 | 1.503 | 1.983 | 2.341 | 2.341 | 1.500 | 1.500 | 60.00 |
| 22.0 | −.002 | 1.359 | 1.357 | 1.981 | 2.342 | 2.342 | 1.500 | 1.500 | 60.00 |
| 20.0 | −.003 | 1.130 | 1.212 | 1.980 | 2.343 | 2.343 | 1.500 | 1.500 | 60.00 |
| 18.0 | −.005 | .921 | 1.067 | 1.979 | 2.345 | 2.345 | 1.500 | 1.500 | 60.00 |
| 16.0 | −.010 | .733 | .923 | 1.981 | 2.348 | 2.348 | 1.500 | 1.500 | 60.00 |
| 14.0 | −.018 | .567 | .778 | 1.984 | 2.353 | 2.353 | 1.500 | 1.500 | 59.99 |
| 12.0 | −.032 | .421 | .632 | 1.992 | 2.362 | 2.362 | 1.500 | 1.500 | 59.99 |
| 10.0 | −.057 | .296 | .484 | 2.005 | 2.377 | 2.376 | 1.500 | 1.499 | 59.98 |
| 8.0 | −.103 | .193 | .331 | 2.028 | 2.400 | 2.399 | 1.500 | 1.499 | 59.96 |
| 6.0 | −.181 | .111 | .172 | 2.066 | 2.440 | 2.437 | 1.500 | 1.498 | 59.92 |
| 4.0 | −.311 | .050 | .000 | 2.129 | 2.503 | 2.500 | 1.500 | 1.497 | 59.89 |
| 2.0 | −.515 | .013 | −.190 | 2.229 | 2.604 | 2.601 | 1.500 | 1.498 | 59.91 |
| .0 | −.802 | .000 | −.404 | 2.384 | 2.759 | 2.760 | 1.500 | 1.501 | 60.03 |
| −2.0 | −1.156 | .014 | −.642 | 2.611 | 2.987 | 2.989 | 1.500 | 1.503 | 60.11 |
| −4.0 | −1.527 | .055 | −.896 | 2.919 | 3.293 | 3.293 | 1.500 | 1.500 | 60.01 |
| −4.0 | −1.852 | .127 | −1.148 | 3.282 | 3.654 | 3.652 | 1.500 | 1.497 | 59.92 |
| −8.0 | −2.097 | .230 | −1.383 | 3.628 | 3.997 | 3.997 | 1.500 | 1.501 | 60.02 |
| −10.0 | −2.262 | .365 | −1.594 | 3.863 | 4.228 | 4.231 | 1.500 | 1.504 | 60.11 |
| −12.0 | −2.363 | .535 | −1.783 | 3.963 | 4.321 | 4.323 | 1.500 | 1.502 | 60.07 |
| −14.0 | −2.423 | .740 | −1.955 | 3.988 | 4.339 | 4.339 | 1.500 | 1.500 | 60.01 |
| −16.0 | −2.457 | .982 | −2.117 | 3.998 | 4.340 | 4.340 | 1.500 | 1.500 | 60.00 |

TABLE 4-continued

Refractive index: 1.525 Prescribed Axial Position: 60.00 Degrees

| y [mm] | x0(y) [mm] | z0(y) [mm] | Delta [degrees] | Kh [dpt] | D0v [dpt] | D0 [dpt] | Astv [dpt] | Ast [dpt] | Axis [degrees] |
|---|---|---|---|---|---|---|---|---|---|
| −18.0 | −2.476 | 1.259 | −2.275 | 4.008 | 4.340 | 4.340 | 1.500 | 1.500 | 60.00 |
| −20.0 | −2.487 | 1.574 | −2.430 | 4.019 | 4.340 | 4.340 | 1.500 | 1.500 | 60.00 |
| −22.0 | −2.493 | 1.926 | −2.586 | 4.032 | 4.340 | 4.340 | 1.500 | 1.500 | 60.00 |
| −34.0 | −2.494 | 2.316 | −2.742 | 4.047 | 4.340 | 4.340 | 1.500 | 1.500 | 59.99 |
| −26.0 | −2.498 | 2.744 | −2.901 | 4.063 | 4.340 | 4.340 | 1.500 | 1.500 | 59.99 |
| −28.0 | −2.499 | 3.211 | −3.061 | 4.080 | 4.340 | 4.340 | 1.500 | 1.500 | 59.99 |
| −30.0 | −2.499 | 3.718 | −3.225 | 4.099 | 4.340 | 4.340 | 1.500 | 1.500 | 59.99 |
| −32.0 | −2.500 | 4.264 | −3.392 | 4.120 | 4.340 | 4.340 | 1.500 | 1.500 | 59.99 |
| −34.0 | −2.500 | 4.851 | −3.562 | 4.143 | 4.340 | 4.340 | 1.300 | 1.500 | 59.99 |
| −36.0 | −2.500 | 5.479 | −3.735 | 4.168 | 4.340 | 4.339 | 1.500 | 1.499 | 59.98 |
| y [mm] | x0(y) [mm] | z0(y) [mm] | Delta [degrees] | Kh [dpt] | D0v [dpt] | D0 [dpt] | Astv [dpt] | Ast [dpt] | Axis [degrees] |

TABLE 5

Refractive index: 1.525 Prescribed Axial Position: 90.00 Degrees

| y [mm] | x0(y) [mm] | z0(y) [mm] | Delta [degrees] | Kh [dpt] | D0v [dpt] | D0 [dpt] | Astv [dpt] | Ast [dpt] | Axis [degrees] |
|---|---|---|---|---|---|---|---|---|---|
| 36.0 | .000 | 3.977 | .058 | 1.628 | 2.340 | 2.340 | 1.500 | 1.500 | 90.00 |
| 34.0 | .000 | 3.548 | .058 | 1.624 | 2.340 | 2.340 | 1.500 | 1.500 | −90.00 |
| 32.0 | .000 | 3.145 | .058 | 1.620 | 2.340 | 2.340 | 1.500 | 1.500 | −90.00 |
| 30.0 | .000 | 2.766 | .057 | 1.617 | 2.340 | 2.340 | 1.500 | 1.500 | −90.00 |
| 28.0 | .000 | 2.412 | .057 | 1.613 | 2.340 | 2.340 | 1.500 | 1.500 | −90.00 |
| 26.0 | .000 | 2.082 | .057 | 1.611 | 2.341 | 2.341 | 1.500 | 1.500 | −90.00 |
| 24.0 | −.001 | 1.777 | .057 | 1.608 | 2.341 | 2.341 | 1.500 | 1.500 | −90.00 |
| 22.0 | −.002 | 1.497 | .057 | 1.606 | 2.342 | 2.342 | 1.500 | 1.500 | −90.00 |
| 20.0 | −.003 | 1.240 | .057 | 1.605 | 2.343 | 2.343 | 1.500 | 1.500 | −90.00 |
| 18.0 | −.005 | 1.008 | .056 | 1.604 | 2.345 | 2.345 | 1.500 | 1.500 | −90.00 |
| 16.0 | −.010 | .800 | .055 | 1.606 | 2.348 | 2.348 | 1.500 | 1.500 | −90.00 |
| 14.0 | −.018 | .615 | .054 | 1.609 | 2.353 | 2.353 | 1.500 | 1.500 | −90.00 |
| 12.0 | −.032 | .455 | .051 | 1.616 | 2.362 | 2.362 | 1.500 | 1.499 | −90.00 |
| 10.0 | −.057 | .318 | .047 | 1.630 | 2.377 | 2.376 | 1.500 | 1.499 | −90.00 |
| 8.0 | −.103 | .205 | .039 | 1.653 | 2.400 | 2.400 | 1.500 | 1.499 | −90.00 |
| 6.0 | −.181 | .117 | .024 | 1.691 | 2.440 | 2.438 | 1.500 | 1.498 | 90.00 |
| 4.0 | .311 | .053 | .000 | 1.754 | 2.503 | 2.501 | 1.500 | 1.496 | 90.00 |
| 2.0 | −.515 | .013 | −.040 | 1.854 | 2.604 | 2.601 | 1.500 | 1.495 | 89.99 |
| .0 | −.802 | .000 | −.101 | 2.009 | 2.759 | 2.757 | 1.500 | 1.496 | 90.00 |
| −2.0 | −1.156 | .014 | −.182 | 2.237 | 2.987 | 2.986 | 1.500 | 1.498 | −89.99 |
| −4.0 | −1.527 | .057 | −.279 | 2.544 | 3.293 | 3.292 | 1.500 | 1.498 | −89.99 |
| −6.0 | −1.852 | .131 | −.375 | 2.907 | 3.654 | 3.654 | 1.500 | 1.499 | −89.99 |
| −8.0 | −2.097 | .239 | −.458 | 3.253 | 3.997 | 3.999 | 1.500 | 1.506 | 90.00 |
| −10.0 | −2.262 | .383 | −.519 | 3.489 | 4.228 | 4.232 | 1.500 | 1.509 | 89.99 |
| −12.0 | −2.363 | .565 | −.559 | 3.589 | 4.321 | 4.323 | 1.500 | 1.505 | 90.00 |
| −14.0 | −2.423 | .785 | −.583 | 3.614 | 4.339 | 4.339 | 1.500 | 1.501 | −90.00 |
| −16.0 | −2.457 | 1.045 | −.598 | 3.625 | 4.340 | 4.340 | 1.500 | 1.500 | −90.00 |
| −18.0 | −2.476 | 1.344 | −.607 | 3.635 | 4.340 | 4.340 | 1.500 | 1.500 | −90.00 |
| −20.0 | −2.487 | 1.684 | −.612 | 3.648 | 4.340 | 4.340 | 1.500 | 1.500 | −90.00 |
| −22.0 | −2.493 | 2.063 | −.616 | 3.661 | 4.340 | 4.340 | 1.500 | 1.500 | −90.00 |
| −24.0 | −2.496 | 2.486 | −.619 | 3.677 | 4.340 | 4.340 | 1.500 | 1.499 | −90.00 |
| −26.0 | −2.498 | 2.949 | −.622 | 3.694 | 4.340 | 4.340 | 1.500 | 1.499 | −90.00 |
| −28.0 | −2.499 | 3.455 | −.625 | 3.712 | 4.340 | 4.340 | 1.500 | 1.499 | −90.00 |
| −30.0 | −2.499 | 4.003 | −.627 | 3.733 | 4.340 | 4.340 | 1.500 | 1.499 | −90.00 |
| −32.0 | −2.500 | 4.595 | −.630 | 3.755 | 4.340 | 4.340 | 1.500 | 1.499 | −90.00 |
| −34.0 | −2.500 | 5.231 | −.633 | 3.780 | 4.340 | 4.340 | 1.500 | 1.499 | −90.00 |
| −36.0 | −2.500 | 5.913 | −.636 | 3.806 | 4.340 | 4.339 | 1.500 | 1.499 | 90.00 |
| y [mm] | x0(y) [mm] | z0(y) [mm] | Delta [degrees] | Kh [dpt] | D0v [dpt] | D0 [dpt] | Astv [dpt] | Ast [dpt] | Axis [degrees] |

The tables show five preferred embodiments of the invented surfaces with different axial positions, noteably 0° respectively 180°, 30°, 45°, 60° and 90°, with for each surface only a strip along the sinous main meridian being given. If this strip has been determined according to the present invention, the remaining surface can be calculated in an as such known manner starting from the strip along the main meridian.

In the tables in detail: x, y and z are the coordinates of a Cartesian coordinate system which is selected in such a manner that the y-axis runs in a vertical direction (in the use position of the ophthalmic lens) and the x-axis in a horizontal direction. The zero point of the coordinate system usually does not lie on the surface, but rather on the projection of the main line on the y, z plane. The z coordinate therefore indicates the distance of the surfaces from the x, y plane, i.e., the distance of a surface point having the coordinates x and y from a plane.

In the five tables, the first three columns give the coordinates x0 and z0 of points on the mainline of the ophthalmic lens for y values of ±36 mm to −36 mm. The fourth column gives the gradient delta (in degrees) of the horizontal sections y=const. in relation to the x-axis as the function of the coordinate y, whereas the fifth column gives the curvature Kh (in diopter) of the horizontal section at the intersection point (x0, z0) with the main line.

Column 6 and the following columns give further following values:

DOv prescribed values for the surface power on the main line in diopter.
DO actual surface power on the main line
Astv prescribed value for the surface astigmatism on the main line in diopter.
Ast actual surface astigmatism on the main line
Axis actual axial position in degrees.

The four functions x0(y), z0y), delta(y) and Kh(y) distinctly determine the surface properties of an infinitesimal strip along the main line. In reverse, the functions z0(y), delta (y) and Kh(y) are distinctly determined by prescribing the course of the surface power D0v(y), the surface astigmatism Astv(y) and the axial position.

As the tables show in the case of the invented ophthalmic lens the prescribed values can be retained along the main line with great consistency.

What is claimed is:

1. An ophthalmic lens having a progressive optic power, said lens being provided with a non eye facing surface of the lens having a surface power which changes in such a manner that, starting from at least one region, in which the optic power of said ophthalmic lens is practically constant, the optic power of said ophthalmic lens changes along at least one line, hereinafter referred to as the main line, which lies in a plane or is sinuous and on which there is a prescribed surface astigmatism which is not identical with zero diopter, wherein the surface astigmatism on said main line not only being a specific amount but also having an axial position along said main line in such a manner that the resulting overall astigmatism of the lens, resulting from the geometric addition of the surface astigmatism and an oblique astigmatism thereof, being practically constant or being variable along said main line with regard to both said amount and said axial position according to physiological requirements, and wherein said main line coincides approximately with the main line of vision described by the eye when lowering the glance.

2. Ophthalmic lens according to claim 1, wherein only one surface contributes to said optic power change.

3. Ophthalmic lens according to claim 1, wherein the prescribed surface astigmatism serving corrective purposes is provided only by the surface astigmatism of said surface having a changing surface power.

4. Ophthalmic lens according to claims 2 or 3, wherein a second surface of said lens being a rotational symmetrical surface.

5. Ophthalmic lens according to claims 1 or 2, wherein a second surface of said lens being a surface having an astigmatic effect and, in particular, being an atoric surface.

6. Ophthalmic lens according to claim 1, wherein the overall astigmatism along said main line is constant with regard to amount and axial position also being provided in the region respectively the regions having at least practically a constant optic power.

7. Ophthalmic lens according to claim 1, wherein said main line is a curve (main meridian) lying in a plane.

8. Ophthalmic lens according to claim 7, wherein in the case of said main line lying in a plane, the normal vectors of the tangential planes at points along said main line do not lie in the main line, except for a finite number of points.

9. An ophthalmic lens having a progressive optic power, said lens being provided with a non eye facing surface of the lens having a surface power which changes in such a manner that, starting from at least one region, in which the optic power of said ophthalmic lens is practically constant, the optic power of said ophthalmic lens changes along at least one line, hereinafter referred to as the main line, which lies in a plane or is sinuous and on which there is a prescribed surface astigmatism which is not identical with zero diopter, wherein the surface astigmatism on said main line not only being a specific amount but also having an axial position along said main line in such a manner that the resulting overall astigmatism of the lens resulting from the geometric addition of the surface astigmatism and an oblique astigmatism thereof, being practically constant or being variable along said main line with regard to both said amount and said axial position according to physiological requirements;

wherein for prescribing not only a value of said surface astigmatism, but also of said axial position of said surface astigmatism along said main line, said main line and the region surrounding it being yielded according to the prescription of the projection $f_1(y)$ of said main line onto the x, y plane according to physiological considerations by minimizing the following performance function:

$$F = \int_{Y_{min}}^{Y_{max}} [(A - A_v)^2 + (H - H_v)^2 + (\epsilon - \epsilon_v)^2] d y$$

with $A_v(y)$, $H_v(y)$ and $\epsilon_v(y)$ being the prescribed surface astigmatism, surface power, and axial position of the surface in relation to the horizontal X plane, respectively, and with $A(y)$, $H(y)$, and $\epsilon(y)$ being the surface astigmatism, surface power, and axial position of the surface in relation to the horizontal x plane, respectively.

* * * * *